United States Patent [19]

Larson et al.

[11] 4,185,863

[45] Jan. 29, 1980

[54] RIGGING FITTING

[76] Inventors: Dean W. Larson, 1716 NW. 29th St., Portland, Oreg. 97210; Melvin M. Northe, 10503 NE. Hoyt, Portland, Oreg. 97220

[21] Appl. No.: 892,950

[22] Filed: Apr. 3, 1978

[51] Int. Cl.² ............................................. B66C 1/14
[52] U.S. Cl. ................................. 294/78 R; 294/74; 403/353
[58] Field of Search ............... 294/74, 78 R, 82 R; 24/114.5, 115 R, 116 R, 241 P; 403/209, 353, 301

[56] References Cited

U.S. PATENT DOCUMENTS

| | | | |
|---|---|---|---|
| 841,726 | 1/1907 | Shaw | 294/74 X |
| 1,225,100 | 5/1917 | Aubrey | 294/74 |
| 1,443,895 | 1/1923 | Harris | 403/209 |
| 1,720,069 | 7/1929 | Yeaton | 294/74 |
| 2,215,023 | 9/1940 | White | 294/74 |
| 2,854,280 | 9/1958 | Wilkerson | 294/78 R X |
| 3,100,323 | 8/1963 | Baker | 403/353 |
| 3,464,093 | 9/1969 | Laharty | 294/78 R X |

*Primary Examiner*—Johnny D. Cherry

[57] ABSTRACT

A rigging fitting wherein a unitary metal body of generally rectangular construction is equipped with a hollow interior and openings and slots extending from the exterior walls there into so as to alternatively provide a double ended fitting or a fitting adapted for use as a carriage hook.

2 Claims, 13 Drawing Figures

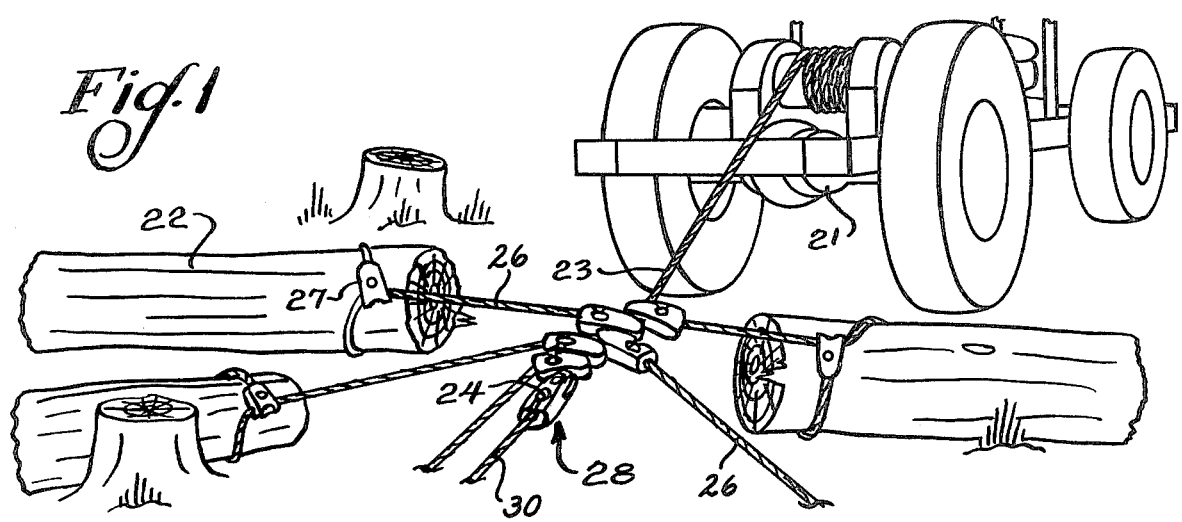
Fig. 1
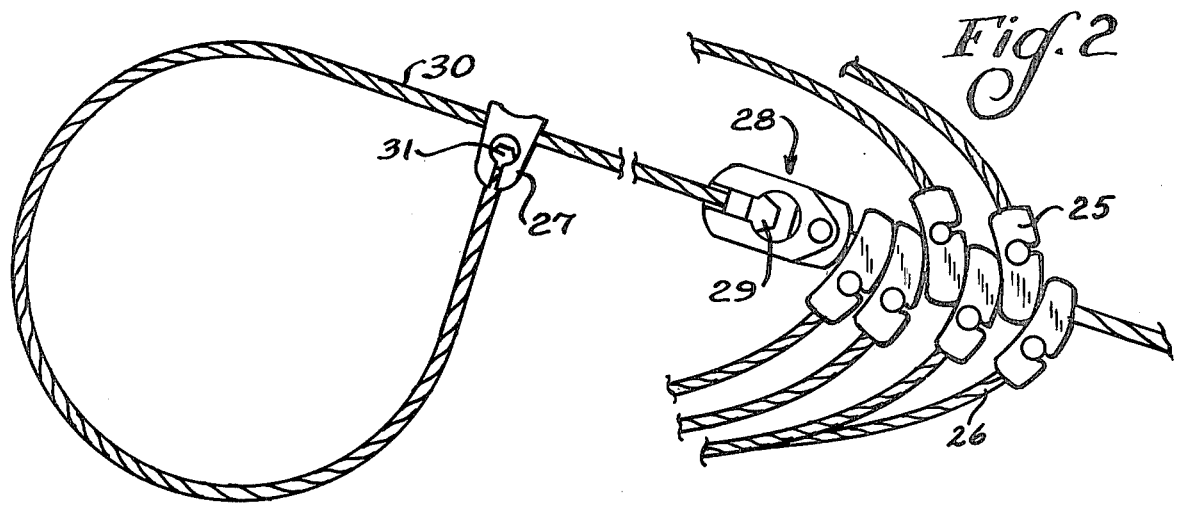
Fig. 2
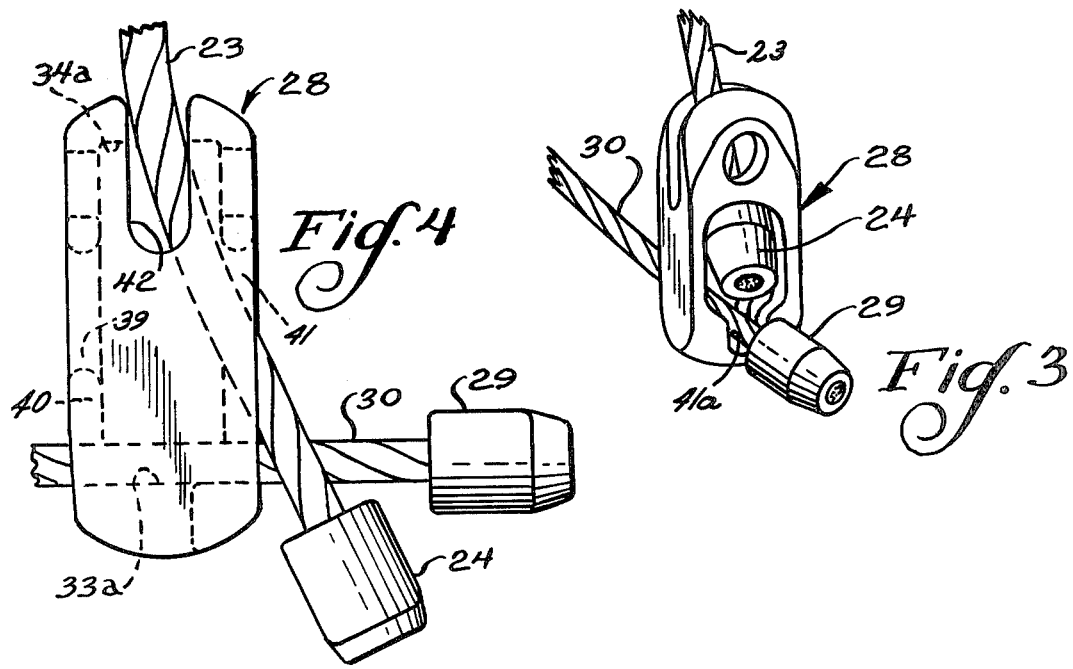
Fig. 4
Fig. 3

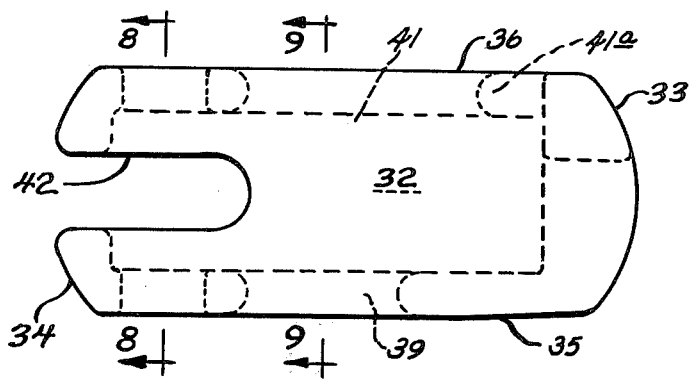
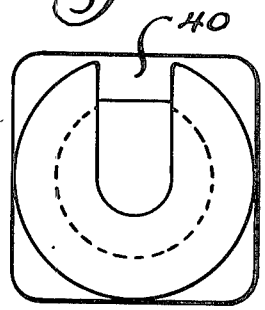
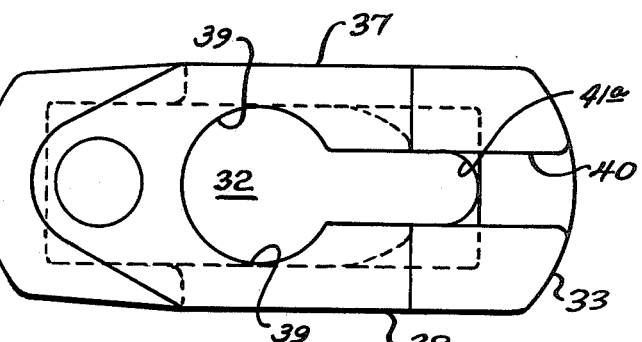
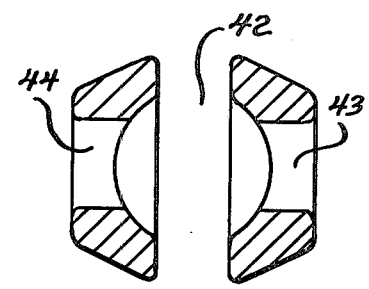
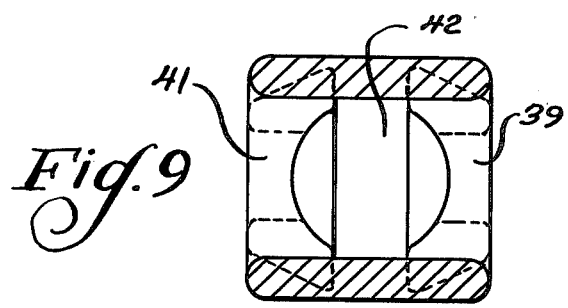

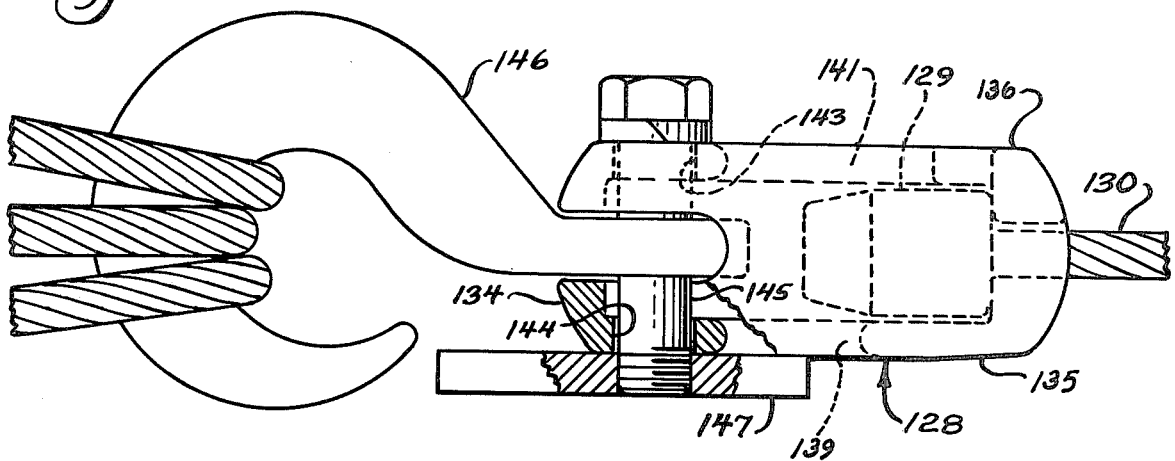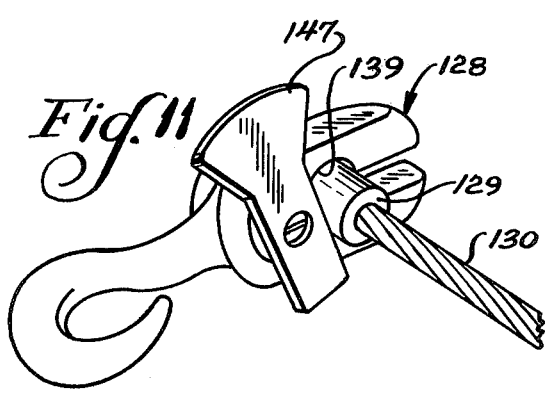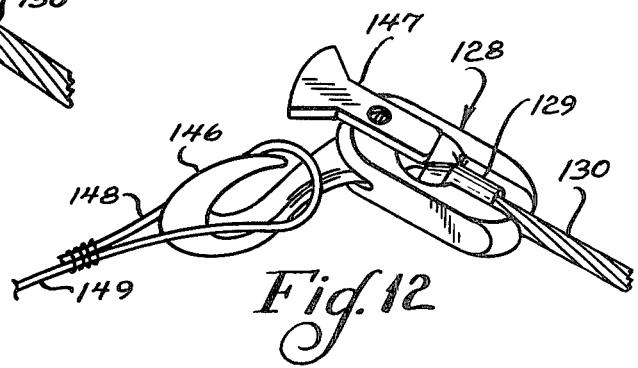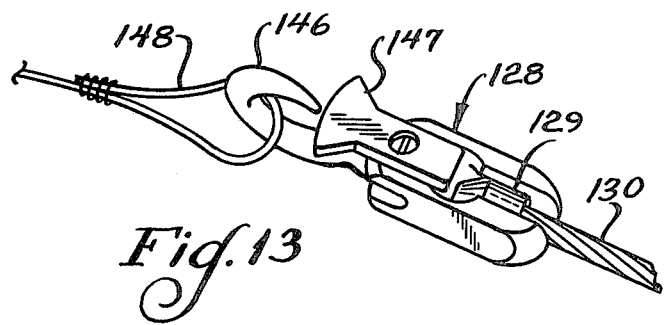

RIGGING FITTING

BACKGROUND AND SUMMARY OF INVENTION

This invention relates to a rigging fitting and, more particularly, to a fitting made up of a unitary metal body of generally rectangular nature which is adapted for use both as a double ended hook and as a carriage hook. As such, it is uniquely universal and versatile in its application.

In logging operations there are numerous applications for a fitting that can mate a rope, terminated with a ferrule or nubbin, to an arch-type hook. Operationally, this allows an operator to use a ferrule, which may easily be field installed, to haul any kind of eye-terminated rope assembly. Up to now, no hook had been able to fulfill this function. It is sometimes desirable to change the interface from ferrule-hook to ferrule-ferrule. This invention also readily adapts to a "double ender"-type arrangement. Compared to hooks that perform a similar function now, this invention has the advantage that it controls the loading of the winchline ferrule such that it does not have a bending moment induced, which causes severely limited rope life at the point of bending.

The details of construction and operation can be seen from the ensuing specification.

DETAILED DESCRIPTION

The invention is described in conjunction with the accompanying drawing, in which FIG. 1 is a fragmentary perspective view of a typical logging operation employing the inventive fitting;

FIG. 2 is an enlargement of the lower central portion of FIG. 1;

FIG. 3 is a perspective view of the inventive fitting shown in the process of being assembled with ferrule-equipped cables for use as a double ended hook;

FIG. 4 is a side elevational view of the inventive fitting;

FIG. 5 is an elevational view of the fitting per se;

FIG. 6 is another elevational view of the fitting per se taken at a right angle to that of FIG. 5;

FIG. 7 is an end elevational view of the fitting seen in FIG. 5;

FIGS. 8 and 9 are sectiional views taken along the sight lines 8—8 and 9—9 respectively as applied to FIG. 5;

FIG. 10 is a fragmentary elevational view of the fitting in use as a carriage hook;

FIGS. 11–13 are perspective views in the sequence of connecting the parts.

In the illustration given and with particular reference to FIG. 1, the numeral 21 designates a tractor employed for pulling logs 22. Conventionally, this is achieved through the use of a winch line 23 equipped with and end ferrule 24. Mounted on the winch line 23 are a plurality of hooks 25 (see also FIG. 2) which are arranged in bunched relation. These hooks can be seen in greater detail in U.S. Pat. No. 3,276,809. Connected to each hook 25 is a wire rope 26 having end ferrules, one of which is received within a choker hook 27.

The instant invention is particularly concerned with the rigging fitting generally designated 28 which advantageously is mounted on the end of the winch line 23 and encompasses the ferrule 24. Additionally, in the illustration given in FIGS. 1–4, the fitting 28 also accommodates a second ferrule 29 which is provided at one end of a wire rope 30. The other end of the wire rope 30 is equipped with a second ferrule 31 which is received in the aforementioned choker hook 27.

The method of assembly of the two ferrules to position within the hollow interior fitting 28 can be appreciated form FIGS. 3 and 4. However, before describing the mode of operation, the structure of the fitting 28 will first be described.

The fitting 28 is seen on the second drawing sheet and in various details in FIGS. 5–9. There, the fitting 28 is seen to include a unitary metal body of generally rectangular configuration and advantageously constructed of alloy steel. The fitting or body 28 has a hollow interior as at 32 and is closed by a first end wall 33 and a second end wall 34. Also enclosing the hollow interior 32 are four generally rectangular side walls, viz., a first side wall 35 and a second side wall 36 which is opposed or parralel to the side wall 35. The third and fourth side walls are designated 37 and 38 (see FIG. 6).

A first opening 39 is provided in the side wall 35 and this communicates with a slot 40 which extends toward and into the first end wall 33 (see particularly FIG. 7). Aligned with the opening 39 is a second opening 41 in the second side wall 36 which terminates in a shorter slat-like portion 41a.

Reference now to FIG. 4 shows that the body 28 is in the process of being equipped with a pair of ferrules 24 and 29. Advantageously, the ferrule 24 may be a "bantam" ferrule, i.e., one connected to a ¾" diameter wire rope 23 while the ferrule 29 is a "dwarf" ferrule connected to a ⅝" diameter wire rope 30. As seen in FIG. 4, the ferrule 29 is already part of the cable 30 and this is inserted through the first opening 41 and thereafter through the second opening 39 as seen in FIG. 3. The wire rope 23 is inserted through the U-shaped slot 42 provided in the second end 34 and extending around into the third and fourth side walls 37 and 38—all while communicating with the hollow interior 32. Thereafter the rope 23 is fixed within the ferrule 24 by means of a wedge or cone element. The wire rope 23 is then pulled so as to position the ferrule 24 against the interior 34a of the second end wall 34 (see FIG. 4). Thereafter, the cable 30 is rotated through the slot 40 and seated against the interior end wall 33a (see FIG. 4)

The alternative mode of usage of the fitting or body (now designated 128) can be seen in FIGS. 10–13. The fitting 128 is equipped with the dwarf ferrule 129 on wire rope 130 as previously discussed. The fitting is characterized by a different attachment at the second end 134. For this purpose, the fitting 128 is equipped with a pair of aligned openings 143 and 144 provided, respective in sides 135 and 136. These are designated 43 and 44 in FIG. 8.

A pin or bolt 145 extends through the openings 143 and 144 and has rotatably supported thereon a cross-eyed hook 146. As illustrated, the pin 145 is a bolt and the smaller end is equipped with a retaining plate 147. The plate 147 prevents the chokers and the ferrule from accidentally coming out as can be appreciated from a consideration of FIG. 13.

The sequence of installation can be appreciated from a consideration of FIGS. 11–13. The retainer plate 147 serves to block opening 141. In FIG. 11, it is seen that the relatively elongated retainer plate 147 is pivoted so that its length is essentially transverse to the length of the relatively elongated fitting 128. At such time, the ferrule equipped end 129 of the rope 130 is inserted through the aligned openings 139–141 and thereafter pivoted to the installed condition seen in FIG. 12. Thereafter, the retainer plate 147 is pivoted to a position of alignment also as seen in FIG. 12 but the hook 146 is pivoted out of alignment with the fitting 128 and plate 147. At such time, the eye 148 of the line 149 is installed and, as can be seen from a consideration of FIG. 13, when the hook 146 is pivoted back into parallelism with the elements 128 and 147, there is provided by the retaining plate 147 a block for both the detachment of the eye 148 from the hook 146 and a disconnection of the ferrule and line 129, 130 from the fitting 128. Thus, a single plate provides a dual protective function.

We claim:

1. A rigging fitting comprising a relatively rectangular unitary metal body providing first and second end walls and four generally rectangular side walls arranged with first and second side walls opposed and third and fourth side walls opposed, said body having a generally hollow interior, a first opening in said first side wall located generally midway between said end walls, a second opening in said second side wall generally aligned with said first opening with both said first and second openings communicating with said hollow interior, a slot in said first side wall connected to said first opening and extending toward and into said first end wall and also communicating with said hollow interior whereby a ferrule-equipped cable is insertable through said first and second openings after which said cable is slidable through said slot to position said ferrule in said interior against said first end wall, aligned third and fourth openings in said first and second side walls, respectively, communicating with said hollow interior and spaced toward said second end wall from said first and second openings, and an elongated slot in said second end wall extending into said both said third and fourth side walls and spaced from said first and second side walls to provide an interior seat on said second end wall whereby said elongated slot is adapted to receive either a cable for double end cable usage or a hook for carriage hook usage.

2. A rigging fitting comprising a relatively rectangular unitary metal body providing first and second end walls and four generally rectangular side walls arranged with first and second side walls opposed and third and fourth side walls opposed, said body having a generally hollow interior, a first opening in said first side wall located generally midway between said end walls, a second opening in said second side wall generally aligned with said first opening with both said first and second openings communicating with said hollow interior, a slot in said first side wall connected to said first opening and extending toward and into said first end wall and also communicating with said hollow interior whereby a ferrule-equipped cable is insertable through said first and second openings after which said cable is slidable through said slot to position said ferrule in said interior against said first end wall, aligned third and fourth openings in said first and second side walls, respectively, communicating with said hollow interior and spaced toward said second end wall from said first and second openings, and an elongated slot in said second end wall extending into said both said third and four side walls whereby said elongated slot is adapted to receive either a cable for double end cable usage or a hook for carriage hook usage, a pin being mounted in said third and fourth openings, a cable equipped hook pivotally mounted on said pin within said hollow interior and projecting out of said second end wall slot, and a retainer plate mounted on said pin but exteriorily of said body and pivotable to prevent both disengagement of a cable from said hook and a ferrule from said hollow interior.

* * * * *